UNITED STATES PATENT OFFICE.

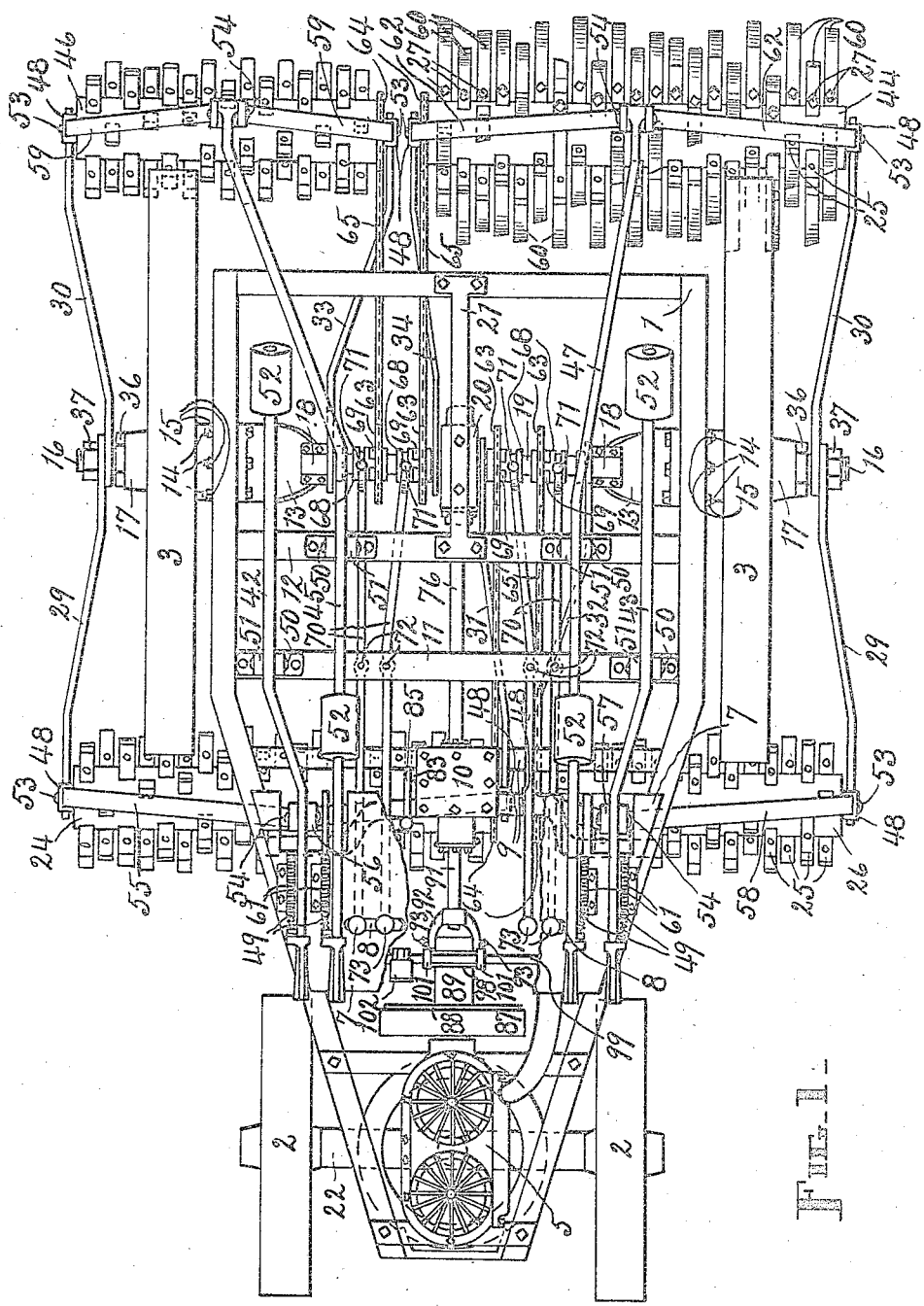

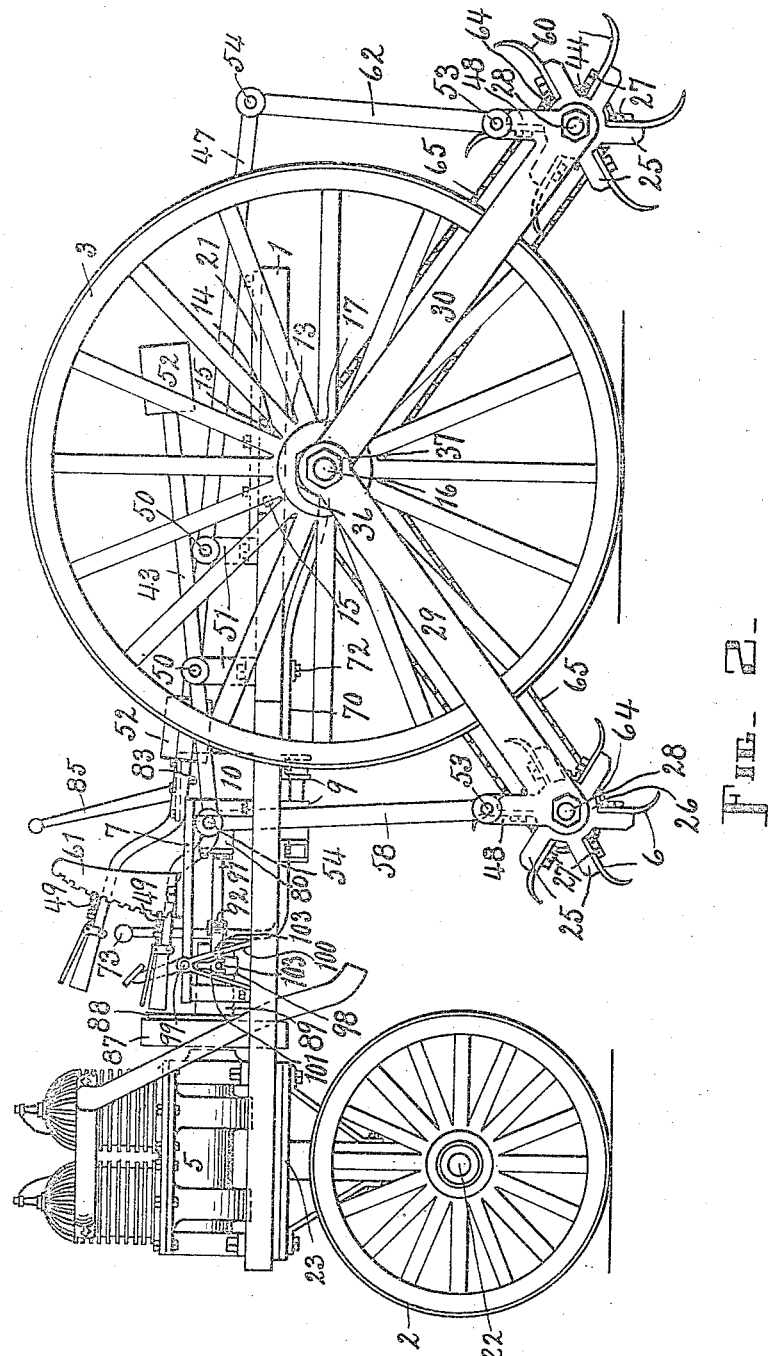

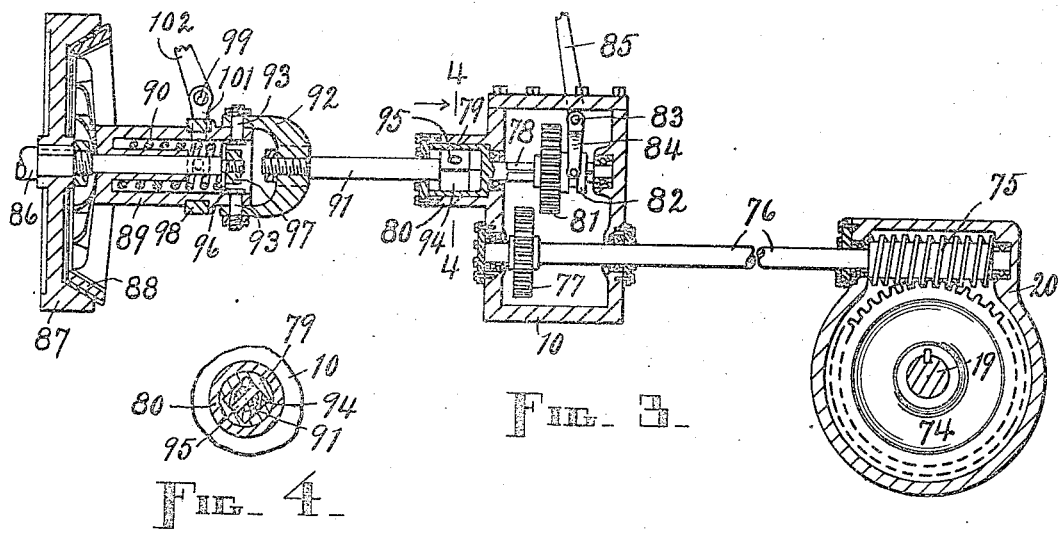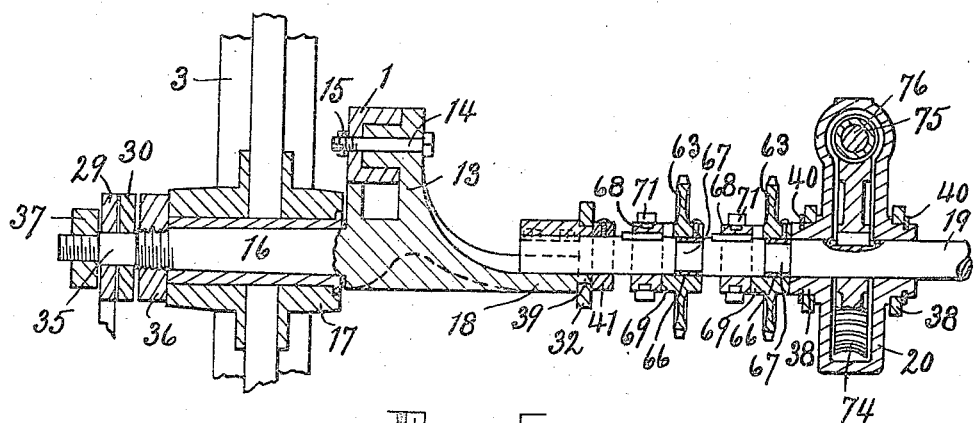

DANIEL F. HESSION, OF SPRINGFIELD, MASSACHUSETTS, ASSIGNOR, BY DIRECT AND MESNE ASSIGNMENTS, TO HESSION TILLER & TRACTOR CORPORATION, OF DETROIT, MICHIGAN, A CORPORATION OF DELAWARE.

ROTARY TILLER.

1,262,791.   Specification of Letters Patent.   Patented Apr. 16, 1918.

Application filed September 8, 1915. Serial No. 49,438.

*To all whom it may concern:*

Be it known that I, DANIEL F. HESSION, a citizen of the United States of America, residing at Springfield, in the county of Hampden and State of Massachusetts, have invented a new and useful Rotary Tiller, of which the following is a specification.

My invention relates to improvements in machines for breaking up, overturning, plowing, or working land or soil to prepare the same for agricultural purposes, and consists generally and usually of a suitable vehicle provided with two pairs of rotary blade-provided members, and certain peculiar means and mechanism for driving and manipulating such members, together with certain new and novel features of construction, all as hereinafter set forth.

Rotary cultivators and the like for the land have been produced, but all have proved failures for various reasons, among which faulty construction, lack of power and adequate power transmission, and absence of suitable means of control for the digging members may be mentioned, and the primary object of my invention is to improve generally and enhance the utility of machines of the type to which said invention appertains, or, in other words, to produce a practicable and efficient combined rotary plow and cultivator or tiller which is free from the above-mentioned defects or objections.

With this machine I am, as just intimated, able both to plow and cultivate at a single operation and with the one machine, something that no other machine has been capable of doing or designed to do.

Another object of my invention is to produce a machine of this kind which is comparatively simple, both in construction and operation, yet strong and durable, and consists of parts that can be easily and quickly repaired or replaced in case breakage does occur.

This tiller is provided with ample power equipment including transmission and with convenient and adequate means for controlling and manipulating the diggers, as will subsequently be made plain.

Other objects and advantages will appear in the course of the following description.

A preferred or at least practical form or embodiment of the invention, whereby I attain the objects and secure the advantages of the same, is illustrated in the accompanying drawings, and I will proceed to describe the invention with reference to said drawings, although it is to be understood that the form, construction, arrangement, etc. of the parts in various aspects are not material and may be modified without departure from the spirit of said invention.

In the drawings, in which like numerals designate like parts throughout the several views, Figure 1 is a top plan of a machine which embodies my invention as aforesaid, the middle portion of the frame platform being broken out to show the parts below, and the blades being omitted from all except one of the digging members; Fig. 2, a side elevation of said machine, a single circumferential set of blade-arms and blades being shown, on each of the two digger rollers therein appearing, in order to illustrate the digging members and their construction more clearly than would be the case if the other sets of blade-arms and blades, which would normally be seen, were included in the view; Fig. 3, an enlarged detail in longitudinal vertical section of the longitudinal power transmission; Fig. 4, a detail in cross-section taken on lines 4—4, looking in the direction of the associated arrow, in Fig. 3, and, Fig. 5, an enlarged detail in longitudinal vertical section of a portion of the transverse power transmission and allied parts, the portion of said last-mentioned transmission that is represented being sufficient to illustrate the same in its entirety.

The digging members or diggers are represented in their lower or depressed and active or operative positions, as is plainly to be seen in Fig. 2.

Before taking up the tiller illustrated in the drawings for a detailed description, I will observe that the tiller may be propelled by means of a tractor or otherwise.

Passing now to the tiller of the drawings, it will be seen that the same comprises a vehicle and a motor or engine mounted thereon, rotary digging members supported from said vehicle and movable into and out of operative position, means to raise and lower said members, means to drive or rotate said members from said engine, and means to control the driving means.

The vehicle comprises a body or frame 1 which is mounted on a pair of rear wheels 2 and a pair of front wheels 3. A gasolene engine 5 is mounted on and secured to the frame 1 at the front end, and mounted on and secured to said frame back of said engine is a platform 7 for the operator. There are two slots 8 in the platform 7, which slots are on opposite sides of the longitudinal central plane of the tiller and at approximately right-angles to such plane. Two pairs of toothed sectors 61 of ordinary construction are secured at their bases to the platform 7, one pair adjacent to each edge of said platform. A pair of cross beams 9 of the frame 1 supports a gear-case 10 back of the platform 7. Back of the beams 9 are two more cross beams 11 and 12 of the frame, and back of these is a pair of brackets 13. The brackets 13 are secured by bolts 14 and nuts 15 to the sides of the frame 1, and each extends in both directions to form a fixed stub-axle 16, for the hub 17 of one of the wheels 2, outside of the outer vertical plane of the adjacent frame side, and a bearing 18, for a shaft 19, inside of the inner vertical plane of said side—see Fig. 5. A gear-case 20 is supported from a bar 21 that extends between the rear end of the frame 1 and the beam 12, in the longitudinal center of the tiller. The shaft 19 passes through the gear-case 20. The front wheels 2 are mounted on an axle 22, and a swivel truck 23, for the front end of the frame 1, is also mounted on said axle.

There are four diggers, two forward and two in the rear, and each consists of a cylinder or roller provided with radial lugs 25, and curved blades secured by bolts 27 to the inside faces, in the direction of rotation, of said lugs. The aforesaid rollers are designated by the numerals 24 and 26, 44 and 46, and the aforesaid blades by the numerals 6 and 60. The rollers 24 and 44 are alike and the rollers 26 and 46 are alike, but said rollers 24 and 26 are front rollers and said rollers 44 and 46 are back rollers. Each of the rollers 26 and 46 is shorter than either of the rollers 24 or 44. The lugs 25 are arranged in rows lengthwise of the rollers, the lugs in each row being in staggered relationship to each other, and those in one row being in offset relationship to those in the two adjacent rows, so that the blades (6 and 60) in any row come into action progressively, and the blades in each succeeding row dig into the earth in the ridges left by the blades in the preceding row. The curved portions of the blades 6 and 60 project beyond the outer ends of the lugs 25. The blades 6 form parts of the two front diggers and do the initial digging hence are shorter than the blades 60 which form parts of the two rear diggers. If such were not the case either too much work would be thrown on the front diggers and an excessive or improperly distributed strain put on the machine, or else all of the blades would have to be too short to produce effective and successful results. With the present arrangement, however, the preliminary and shallower furrows are first dug by the forward blades and then such furrows are deepened to the necessary extent by the rear blades, which enables the strain on the machine and operating parts to be distributed in a substantially uniform manner.

The front digger which includes the roller 26 is shorter than the digger which includes the roller 24, and the rear digger which includes the roller 46 is shorter than the rear digger which includes the roller 44. The longer digger at the back end is behind the shorter digger and a portion of the longer digger in front, so that the ground space between the front diggers, which is unbroken by the latter, is dug up by said longer digger at the back. The ground space between the rear diggers is not acted on by either of them, after being dug up by the longer forward digger which is in front of said space, but this and the ground space between the front diggers are so narrow that no appreciable difficulty is found in digging the one solely with the longer of the larger diggers, or effect results from digging the other solely with the longer of the smaller diggers.

Each of the digger rollers (24, 26, 44 and 46) has trunnions 28 at its ends, and a pair of swinging arms is provided to receive at their outer ends and afford bearings for said trunnions. The outer arms for the trunnions 28 on the front rollers are represented at 29—29, and the outer arms for the trunnions on the rear rollers are represented at 30—30, while the inner arms for the trunnions on said front rollers are represented at 31 and 32, and the inner arms for the trunnions on said rear rollers are represented at 33 and 34. The arms 29 and 30 are loosely mounted on the stub-axles 16, which are turned down to receive them, as represented at 35 in Fig. 5, outside of nuts 36 which are applied to said axles to confine the wheel hubs 17 thereon in place. Nuts 37 are also applied to the stub-axles 16 to hold the arms 29 and 30 thereon in place. The arms 29 extend forward and downward from the stub-axles, and the arms 30 extend backward and downward from said axles. The gear-case 20 is provided at the sides around the shaft 19 with bearing lugs 38—38 for the inner and adjacent ends of the arms 31 and 34, which are loosely mounted thereon, and the bearings 18 are provided at their inner ends with hollow bearing lugs 39 for the inner ends of the arms 32 and 33, which latter are loosely mounted on said lugs 39. Split-rings 40—40 set in the lugs 38 are employed to hold the arms 31 and 34 in place on said lugs, and collars 41 secured to the shaft 19 are provided to prevent the arms 32 and 33 from slipping off of the lugs 39. The arm 31 extends forward and downward from the left-hand lug 38 to the inner trunnion 28 on the roller 24, while the arm 34 extends rearward and downward from the other lug 38 to the inner trunnion 28 on the roller 46, and the arm 32 extends forward and downward from the lug 39 on the left-hand bearing 18 to the inner trunnion 28 on the roller 26, while the arm 33 extends rearward and downward from the lug 39 on the right-hand bearing 18 to the inner trunnion 28 on the roller 46. The axial centers of all of the arms 29, 30, 31, 32, 33 and 34, at either end, are in the same horizontal line, and any digger when raised or lowered swings in its supporting pair of arms from the axial center of the shaft 19.

The raising and lowering mechanism for the diggers comprises four approximately horizontal operating levers 42, 43, 45, and 47, a pair of oblique connecting arms or bars for each digger, spring-pressed latches 49 on said levers, and the sectors 61. Each of the levers 42 and 43 is pivotally attached between its ends at 50 to a bracket 51 secured to the cross beam 11, and each of the levers 45 and 47 is similarly attached to a like bracket secured to the cross beam 12. These levers are all longitudinally disposed in the machine, and extend forwardly over the platform 7 where they terminate in handles and have the latches 49 attached thereto, the latter being in operative position relative to the sectors 61. The latches 49 in construction and operation are old and well known, and they are capable of engaging the sector teeth and retaining the operating levers in whatever positions it may be desired to leave them. The levers 42 and 43 have counterweights 52 at their rear terminals, and the levers 45 and 47 have similar counterweights thereon forward of the pivotal points of said last-mentioned levers. At the outer terminals of the swinging arms 29, 30, 31, 32, 33 and 34 are upwardly-directed lugs 48, and these lugs on each pair of arms are connected with the associated operating lever by means of two oblique arms or bars which have their outer and lower ends pivoted at 53—53 to said lugs and their inner and upper ends pivoted at 54 to said lever. The oblique connecting bars just referred to are designated as follows: Those for the longer front digger by the numerals 55 and 56, those for the shorter front digger by the numerals 57 and 58, those for the shorter rear digger by the numerals 59—59, and those for the longer rear digger by the numerals 62—62. The bars 55 and 56 and 57 and 58 are pivoted to the levers 42 and 43 at points which are in front of the pivotal points 51 of such levers, and the bars 59 and 62 are pivoted to the levers 45 and 47 at points which are behind the pivotal points 51 of said last-mentioned levers.

It is now clear that any digger can be raised or lowered at the ends of its supporting or carrying arms, such arms swinging on their supports, through the medium of the oblique bars and by means of the operating lever which controls such digger. The lever is grasped at the forward end for the operation, and its latch 49 is first disengaged from the associated sector 61, then the lever is moved to raise or lower the digger and said latch is permitted to reëngage said sector. The counterweights 52 assist materially in the raising and lowering operations, as they relieve the operator of considerable strain. The forward ends of the levers 42 and 43 are raised to elevate the front diggers, and the corresponding ends of the levers 45 and 47 are depressed to elevate the rear diggers, as is plainly to be seen must be the case.

The shaft 19 is an essential element of the transmission, which will next be described, and the diggers are driven from said shaft through the medium of four sprocket-wheels 63 on said shaft, two on one side of the gear-case 20 behind the space between the vertical planes, if continued upward, of the adjacent ends of the rollers 24 and 26, and two on the other side of said gear-case in front of the space between the vertical planes, if continued upward, of the adjacent ends of the rollers 46 and 44; the same number of sprocket-wheels 64 secured on the trunnions 28 at the aforesaid adjacent ends of said rollers, and in line with said first-mentioned sprocket-wheels; and four sprocket-chains 65 which connect the sprocket-wheels 64 with the sprocket-wheels 63. The sprocket-wheels 63 are secured to split-ring bushings 66 which are loose on the shaft 19. The bushings 66 are received in grooves 67 in the shaft 19, as shown in Fig. 5, so that axial movement on the part of said bushings and the sprocket-wheels 63 is prevented. Keyed to the shaft 19 adjacent to each sprocket-wheel 63 is a clutch member 68, which is normally in engagement with a clutch member 69 on the contiguous side of said sprocket-wheel. Without some provision of this kind it would not be possible to disconnect any of the diggers, but all would necessarily revolve together, whereas there may be occasions when it is desired to throw out or leave idle one or more of said diggers.

As a simple and convenient means for actuating the clutch members 68 out of engagement with the clutch members 69 I provide four horizontal levers 70. Each lever 70 is provided at its rear end with a fork 71 to engage in the usual manner one of the members 68, is pivoted between the ends at 72 to the underside of the cross beam 11, and has at its front terminal an upward extension or handle 73 which is received in one or the other of the slots 8 in the platform 7. To throw out any clutch the handle 73, of the lever 70 that is connected with said clutch, is grasped by the operator and moved inwardly, that is, toward the longitudinal center of the machine, which action moves said lever on its pivot 72 in the direction required to slide the clutch member 68, which is in the fork 71 of said lever, out of engagement with the companion clutch member 69. The sprocket-wheel 63 thus released is left free on the shaft 19 and does not revolve therewith, consequently the digger driven by such sprocket-wheel remains idle. A reversal of the operation just described causes the clutch to be thrown in again. The handles 73 project above the platform 7 so as to be within convenient reach of the operator.

A worm-gear 74 is secured on the shaft 19 within the gear-case 20, and a worm 75, also within said case, engages and drives said gear and with it said shaft and the parts mounted thereon to revolve therewith and drive the diggers, said worm being secured to a shaft 76 at the rear terminal thereof, as clearly shown in Fig. 3. The shaft 76 is in the longitudinal center of the machine and journaled in the gear-cases 10 and 20. A gear 77 is secured to the shaft 76 near the front end of the same within the gear-case 10. Journaled in the gear-case 10 above the shaft 76 and parallel therewith is a short shaft 78 which is provided at the front end with a recessed enlargement or socket 79. The socket 79 fits and revolves within a hub 80 on the front side of the gear-case 10. The major portion of the shaft 78 is rectangular in cross-section, and mounted on such portion is a gear 81. The gear 81 is adapted to be moved into and out of engagement with the gear 77, the shifting elements comprising a grooved hub 82 on said gear 81, a rock-shaft 83 journaled in the gear-case 10 crosswise of the shaft 78, a fork 84 secured to said shaft 83 and in engagement with the grooved part of said hub, and a lever 85 secured to said shaft outside of said case. The lever 85 extends upwardly behind the platform 7 and above the horizontal plane of the top of said platform into convenient position to be grasped by the right hand of the operator. The gear 81 is actuated into engagement with the gear 77 by drawing back the lever 85, the latter then operating through the rock-shaft 83, the fork 84 and the hub 82 to move said gear 81 forward into such engagement, and said gear 81 is actuated rearwardly out of engagement with said gear 77 by throwing said lever forward.

The shaft 78 is driven from the shaft of the engine 5, the rear end portion of which engine shaft appears at 86 in Fig. 3, by means of a clutch member 87 secured to said shaft 86, a clutch member 88 and chambered sleeve 89 loosely mounted on said shaft 86 behind said member 87, a spring 90 arranged within said sleeve normally to force said member 88 into engagement with said member 87, and a shaft 91 which is provided at its front end with a yoke 92 that is bolted to the rear end of said sleeve at 93—93, and has at its rear end a rectangular head 94 that is received in the socket 79. A transverse pin 95 is employed to secure the head 94 to the shaft 91. The recess in the socket 79 for the head 94 is rectangular to correspond with the shape of said head. The head 94, when revolved with the shaft 91, carries with it the socket 79 and the shaft 78 and gear 81, but said head is free to reciprocate in said socket. The spring 90 is confined between the front end of the chamber in the sleeve 89 and a washer 96 and nut 97 on the back end of the engine shaft 86.

The sleeve 89 is provided exteriorly with a collar 98 which is received in a peripheral groove in said sleeve. A transverse rock-shaft 99, which is located above the collar 9 and journaled at each end in a bracket 100 mounted on the frame 1, carries two depending arms 101 and an upwardly-extending foot lever 102. Each of the arms 101 is forked at the lower end to engage a pin 103 that projects from the adjacent side of the collar 98. The lever 102 extends upwardly through a slot (not shown) in the platform 7, convenient to the foot of the operator. When the foot lever is pressed forward the rock-shaft 99 is actuated to throw back the arms 101 and, through the medium of the pins 103 and the collars 98, to move the sleeve 89 rearwardly against the resiliency of the spring 90 and withdraw the clutch member 88 from engagement with the clutch member 87, said sleeve and member 88 sliding on the shaft 96. Upon the release of the lever 102 the spring 90 acts immediately to restore the parts to their former positions and reëngage the clutch member 88 with the clutch member 87.

Normally the sleeve 89 and shafts 91 and 78 revolve with the engine shaft 86, and in order to throw in the transmission back of these members it is expedient not to say necessary to free the driving parts for the gear 81 from the engine, so that said gear can be engaged with the gear 77 without shock or danger of stalling the engine. To do this the clutch member 88 is disengaged from the clutch member 87, by means of the foot lever 102, the head 94 then sliding rearwardly in the socket 79, and the lever 85 is operated to actuate the gear 81 forwardly into engagement with the gear 77, after which said lever is released and the spring 90 forces the parts subject thereto forward again and said member 88 into engagement once more with said member 87, said head this time sliding forwardly in said socket.

I will now explain briefly the operation of the tiller as a whole.

The engine is started and the transmission thrown in while the diggers are in elevated position with the blades 6 and 60 clear of the ground. The diggers are thus set to revolving while in the air, the power being transmitted to them through the several shafts, the gears including the worm drive, the sprocket-wheels and sprocket-chains, and the other elements previously described. While the diggers are in motion the levers 42, 45, 47 and 43 are released from the sectors 61 and actuated to lower said diggers into operative position, with the blades 6 and 60 cutting into the soil and throwing it up to prepare the same for planting, the double result of plowing and harrowing being obtained as the tiller is propelled or drawn forward. As soon as the diggers are lowered the latches 49 are permitted to reengage the sectors 61, so that said diggers shall be held down in operative position. The forward movement of the tiller may be commenced either before or after the diggers have been lowered into operative position. The diggers continue to revolve and do their work until such time as the power is disconnected, by throwing the gear 81 out of mesh with the gear 77, throwing out the clutch which comprises the members 88 and 89, or stopping the engine, unless the immediate driving mechanism for an individual digger be disconnected by means of the lever 70 which controls the same. The levers 70 may be operated to stop the diggers either while the latter are in their operative or inoperative position, but in order to avoid stalling the engine no clutch member 68 should be thrown in while the digger driven thereby is in operative position. At the end of the digging operation the diggers should be elevated.

Since the axis of the shaft 19 and the axial centers of the upper and inner ends of the arms 29, 30, 31, 32, 33 and 34 are the same or in the same line, the axes of the forward diggers and the axial centers of the lower and outer ends of the arms 29, 31 and 32 are in line with each other, on the one hand, and the axes of the rear diggers and the axial centers of the lower and outer ends of the arms 30, 33 and 34 are in line with each other, on the other hand, the distances between the driving and driven sprocket-wheel axes is maintained while the diggers are being raised and lowered and regardless of the position in which said diggers, either singly or collectively, may be left.

In a machine of this character some little flexibility, not only in the transmission but also in the operating parts and structure generally, is needed, and this important factor has been taken into consideration in the present machine, it being to this end that the clutches and sprocket elements and the particular lever-operated elevating and depressing mechanism for the diggers have been provided.

What I claim as my invention, and desire to secure by Letters Patent, is—

1. A rotary tiller comprising a vehicle, sets of front and rear diggers arranged with the inner ends of the diggers in one set out of line with the inner ends of the diggers in the other set, said diggers being supported from said vehicle, means to raise and lower said diggers, and means to rotate said diggers.

2. A rotary tiller comprising a vehicle, front diggers, of unequal lengths, supported from said vehicle, rear diggers, of unequal lengths, supported from said vehicle, the longer digger of one pair and the shorter digger of the other being arranged in offset relationship, means to elevate and depress said diggers, and means to rotate said diggers.

3. A rotary tiller comprising a vehicle, front diggers, of unequal lengths, supported from said vehicle, rear diggers, of unequal lengths, supported from said vehicle, the longer digger of one pair and the shorter digger of the other being arranged in offset relationship, and the front diggers being smaller in diameter than the rear diggers, means to elevate and depress said diggers, and means to rotate said diggers.

4. In a rotary tiller, a frame provided with running-gear, forwardly and rearwardly extending arms mounted to swing in said frame, front and rear sets of diggers carried by said arms, said diggers in one set and said diggers in the other set being in offset relationship, means to raise and lower any individual digger with the arms carrying the same, and means to drive said diggers.

5. In a rotary tiller, a frame provided with running-gear, forwardly and rearwardly extending arms mounted to swing from said frame, front and rear sets of diggers carried by said arms, said diggers in one set and said diggers in the other set being in offset relationship, means to raise and lower said diggers with said arms, and means to drive said diggers individually and collectively.

6. In a rotary tiller, a frame provided with running-gear, forwardly and rearwardly extending arms mounted to swing in said frame, front and rear sets of diggers carried by said arms, said diggers in one set and said diggers in the other set being in offset relationship, means to raise and lower any individual digger with the arms carrying the same, and means to drive said diggers individually and collectively.

7. In a rotary tiller, a frame provided with running-gear, forwardly and rearwardly extending arms mounted to swing from said frame, front diggers and rear diggers carried by said arms, levers pivotally mounted in said frame, connecting members between the forwardly extending arms and certain of said levers, said connecting members being attached to their levers forward of the pivotal points thereof, connecting members between the rearwardly extending arms and the rear ends of certain others of said levers, means to lock and release said levers, and means to rotate said diggers.

8. In a rotary tiller, a frame provided with running-gear, forwardly and rearwardly extending arms mounted to swing from said frame, front diggers and rear diggers carried by said arms, levers pivotally mounted in said frame, connecting members between the forwardly extending arms and certain of said levers, said connecting members being attached to their levers forward of the pivotal points thereof, connecting members between the rearwardly extending arms and the rear ends of certain others of said levers, counterweights on said levers, means to lock and release said levers, and means to rotate said diggers.

9. The combination, in a rotary tiller, with a frame, brackets attached to said frame and provided with bearings and stub-axles, said bearings having bearing hubs and said stub-axles having bearing extensions, a member supported from said frame and having bearing hubs, a shaft journaled in said bearings, wheels mounted on said stub-axles, forwardly and rearwardly extending arms mounted on said bearing extensions and said bearing hubs, diggers carried by said arms, and running-gear for the front end of said frame, of means to raise and lower said diggers with said arms, driving mechanism between said shaft and diggers, and means to drive said shaft.

10. The combination, in a rotary tiller, with a frame provided with running-gear, an engine mounted on said frame and having a driving shaft, forwardly and rearwardly extending arms mounted to swing from said frame, front and rear diggers carried by said arms, and means to elevate and depress said diggers, of a transverse driven shaft carried by said frame, a driven member secured to said shaft, a longitudinal driving shaft carried by said frame, a driving member on said longitudinal shaft for said driven member, a clutch on said engine shaft, means to throw out said clutch, a clutch shaft and an intermediate driving shaft rotatably coupled together, but the former having independent longitudinal movement relative to the latter, means to support said intermediate shaft, means to connect said intermediate shaft with said first-mentioned driving shaft and to disconnect it therefrom, and driving mechanism between said transverse shaft and said diggers.

11. A rotary tiller comprising a vehicle, front and rear diggers arranged with the outer ends of the two sets approximately in line with each other, at each side of the machine, but with the inner ends of the diggers in one set out of line with such ends of the diggers in the other set, said diggers being supported from said vehicle, means to raise and lower said diggers, and means to rotate said diggers.

DANIEL F. HESSION.

Witnesses:
F. A. CUTTER,
A. C. FAIRBANKS.